US007665439B2

(12) United States Patent
Eichenberger et al.

(10) Patent No.: US 7,665,439 B2
(45) Date of Patent: Feb. 23, 2010

(54) SINGLE PIECE ROTOR

(75) Inventors: David A. Eichenberger, Sanford, NC (US); Timothy R. Cooper, Titusville, NJ (US)

(73) Assignee: Ingersoll Rand Company, Montvale, NJ (US)

( * ) Notice: Subject to any disclaimer, the term of this patent is extended or adjusted under 35 U.S.C. 154(b) by 368 days.

(21) Appl. No.: 11/746,758

(22) Filed: May 10, 2007

(65) Prior Publication Data

US 2008/0276893 A1 Nov. 13, 2008

(51) Int. Cl.
*F02N 7/08* (2006.01)
*B23P 6/00* (2006.01)

(52) U.S. Cl. ............................ 123/179.31; 29/888.021

(58) Field of Classification Search ............ 123/179.31; 29/888.021
See application file for complete search history.

(56) References Cited

U.S. PATENT DOCUMENTS 1,598,820 A 9/1926 Hillmer
1,760,988 A 6/1930 Lansing
2,358,445 A * 9/1944 Cone ..................... 123/179.31
2,441,990 A 5/1948 Calhoun
2,558,840 A * 7/1951 Gordon ................. 123/179.31
3,010,443 A 11/1961 Lyvers
3,313,239 A * 4/1967 Brunson et al. ............. 418/179
3,791,365 A 2/1974 Pharr et al.
3,816,040 A * 6/1974 Janik ..................... 123/179.31
4,080,541 A 3/1978 Mazzorana
4,126,113 A * 11/1978 Sarro et al. ............ 123/179.31
4,362,065 A 12/1982 Baratti
4,839,245 A * 6/1989 Sue et al. ..................... 428/698
5,045,737 A 9/1991 Yamauchi
5,105,670 A 4/1992 Isozumi et al.
RE33,919 E * 5/1992 Kristoff et al. ......... 123/179.31
5,134,330 A 7/1992 Haas et al.
5,146,797 A 9/1992 Annovazzi et al.
5,163,335 A 11/1992 Isom et al.
5,267,539 A * 12/1993 Becker et al. .......... 123/179.31
5,281,115 A 1/1994 Timuska
5,291,861 A * 3/1994 Bartlett .................. 123/179.31
5,329,896 A 7/1994 Everts
5,387,088 A * 2/1995 Knapp et al. .................. 417/53

(Continued)

FOREIGN PATENT DOCUMENTS

JP 4183242 A 6/1992

(Continued)

*Primary Examiner*—Stephen K Cronin
*Assistant Examiner*—Arnold Castro
(74) *Attorney, Agent, or Firm*—Michael Best & Friedrich LLP

(57) ABSTRACT

A starter for moving a movable portion of an engine to start the engine includes a gear housing, a gear assembly within the gear housing, an output member at a first end of the gear assembly adapted to operably couple to the movable portion of the engine, a motor housing, and a rotor rotatably mounted within the motor housing. The rotor has a shaft portion and a vane portion that are an integral, unitary piece. The shaft portion has splines for mating with the gear assembly. The splines prevent relative rotational movement between the rotor and the gear assembly and permit relative axial movement. The rotor is formed from aluminum and at least a portion of the rotor includes an anodized coating.

19 Claims, 5 Drawing Sheets

U.S. PATENT DOCUMENTS

| | | | | | |
|---|---|---|---|---|---|
| 5,394,681 | A | * | 3/1995 | Nolan et al. | 56/249 |
| 5,767,585 | A | | 6/1998 | Shiga et al. | |
| 5,831,340 | A | | 11/1998 | Kobayashi et al. | |
| 5,834,852 | A | | 11/1998 | Katoh et al. | |
| 5,836,739 | A | | 11/1998 | Haramura et al. | |
| 5,847,471 | A | | 12/1998 | Morishita et al. | |
| 6,559,566 | B2 | | 5/2003 | Modi et al. | |
| 6,633,099 | B2 | | 10/2003 | Fulton et al. | |
| 6,731,037 | B1 | | 5/2004 | Kim et al. | |
| 6,817,258 | B2 | | 11/2004 | Kajino et al. | |
| 6,834,630 | B1 | | 12/2004 | Mueller et al. | |
| 6,930,430 | B2 | | 8/2005 | Shiga et al. | |
| 6,969,235 | B2 | | 11/2005 | Feest | |
| 7,217,099 | B2 | * | 5/2007 | Casanova et al. | 416/219 R |
| 2004/0237677 | A1 | | 12/2004 | Inagaki | |
| 2005/0053467 | A1 | * | 3/2005 | Ackerman et al. | 416/241 R |
| 2006/0222503 | A1 | * | 10/2006 | Fledersbacher et al. | 416/229 A |
| 2008/0257295 | A1 | * | 10/2008 | Eichenberger et al. | 123/179.31 |

FOREIGN PATENT DOCUMENTS

| | | | | |
|---|---|---|---|---|
| JP | 10089203 | A | | 4/1998 |
| JP | 2008074390 | A | * | 4/2008 |

* cited by examiner

SINGLE PIECE ROTOR

FIELD OF THE INVENTION

The present invention relates to rotors for air engine starters for internal combustion engines.

BACKGROUND

Internal combustion engines are typically provided with starter systems for initiating operation of the engine. Starter systems often include an air motor driven by pressurized air and a gear system. Pressurized air is introduced to the air motor, causing a rotor to rotate. The rotor, which has a higher number of revolutions per minute (rpm) than what is needed to start the engine, is connected to the gear system, which includes one or more speed reducing gears configured to match the air motor rpm to the engine rpm. The reducing gears drive an output device such as a pinion, which is coupled to the engine. Rotation of the pinion in turn rotates the engine, initiating operation of the engine.

SUMMARY

In one embodiment, the invention provides a starter for moving a movable portion of an engine to start the engine. The starter includes a gear housing having first and second opposite ends, a gear assembly within the gear housing and including a plurality of speed-reducing gears, an output member at the first end of the gear assembly aligned with the movable portion of the engine and adapted to operably couple to the movable portion of the engine, a motor housing having a first end mounted to the second end of the gear housing and a second end opposite the first end, a motive fluid inlet adapted to permit a flow of motive fluid into the motor housing, a rotor rotatably mounted within the motor housing and a motive fluid outlet mounted to the second end of the motor housing, and adapted to exhaust the motive fluid to a desired destination after the motive fluid has flown through the motor housing. The rotor has a shaft portion and a vane portion that are an integral, unitary piece. The shaft portion has splines for mating with the gear assembly. The splines prevent relative rotational movement between the rotor and the gear assembly and permit relative axial movement. The rotor is formed from aluminum and at least a portion of the rotor includes an anodized coating.

The rotor can further include a stub portion on an opposite side of the vane portion as the shaft portion, the stub portion being integrally formed with the vane portion and the shaft portion. In some embodiments, substantially the entire surface of the rotor includes an anodized coating. The anodized coating can be a hard anodized coating, and can have a thickness of from about 0.0005-0.0045 inches. The rotor can be a solid member.

In another embodiment, the invention provides a method of servicing a starter for moving a movable portion of an engine to start the engine. The method includes accessing a service aperture in the starter, removing a rotor from the starter through the service aperture, removing an air motor shaft from the starter through the service aperture and replacing the rotor and the air motor shaft with an integral rotor. The integral rotor has a shaft portion and a vane portion that are an integral, unitary piece. The shaft portion has splines for coupling to a movable portion of the engine in which the splines prevent relative rotational movement between the integral rotor and the movable portion and permit relative axial movement. The integral rotor is formed from aluminum and at least a portion of the integral rotor includes an anodized coating.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
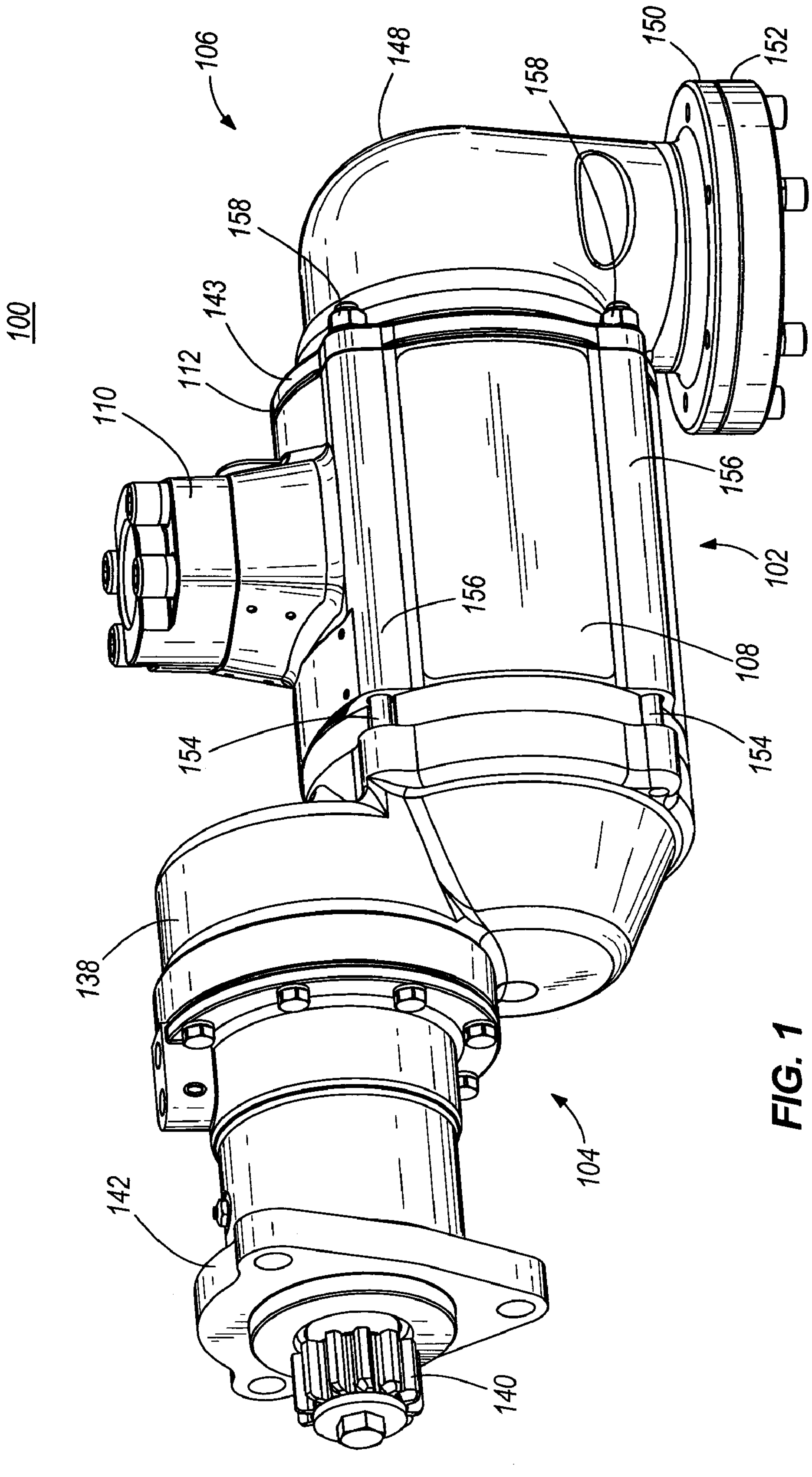
FIG. 1 is a perspective view of a starter system according to one embodiment of the invention.
Figure 2:
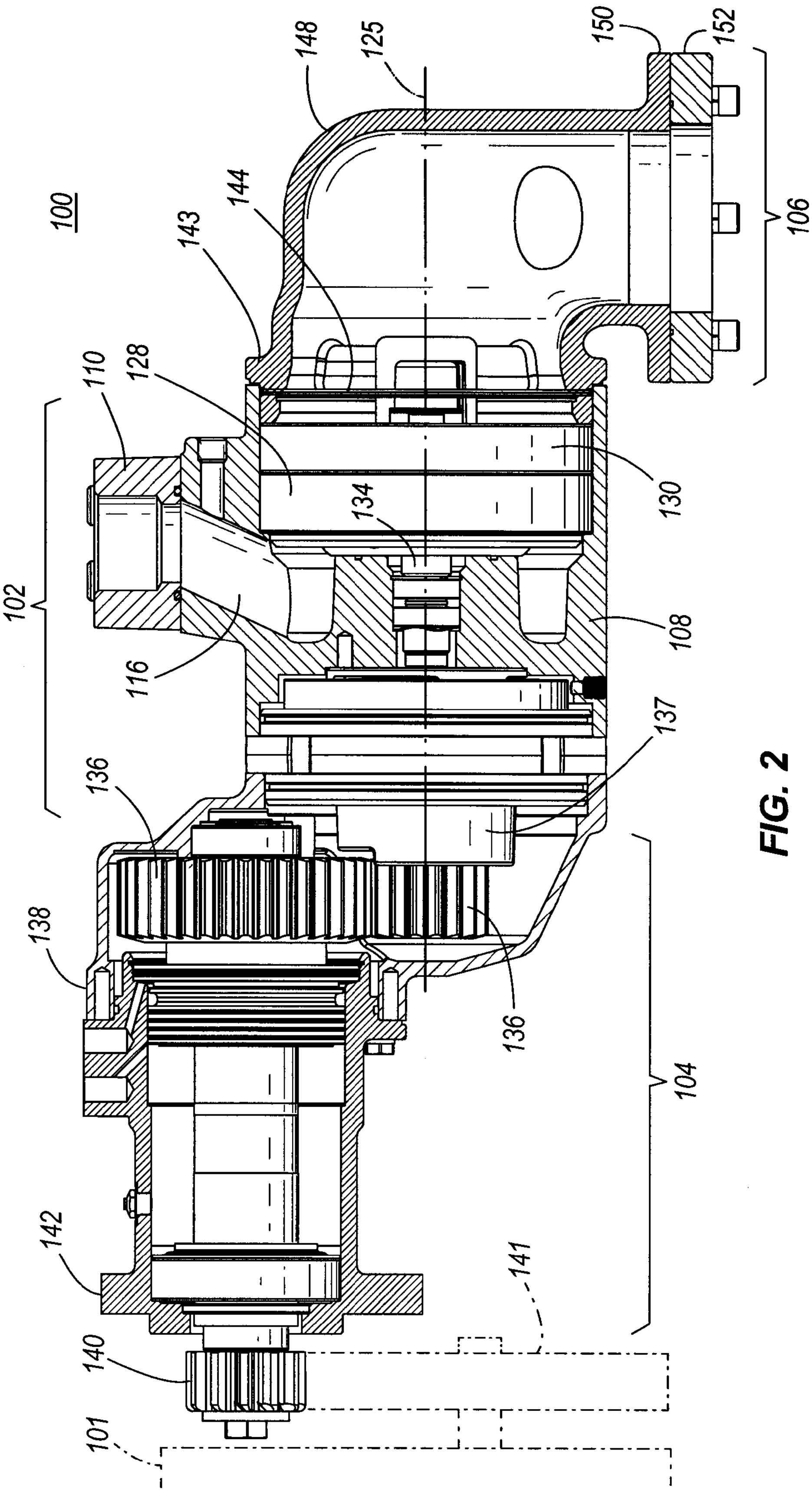
FIG. 2 is a cross-sectional view of the starter system of FIG. 1.
Figure 3:
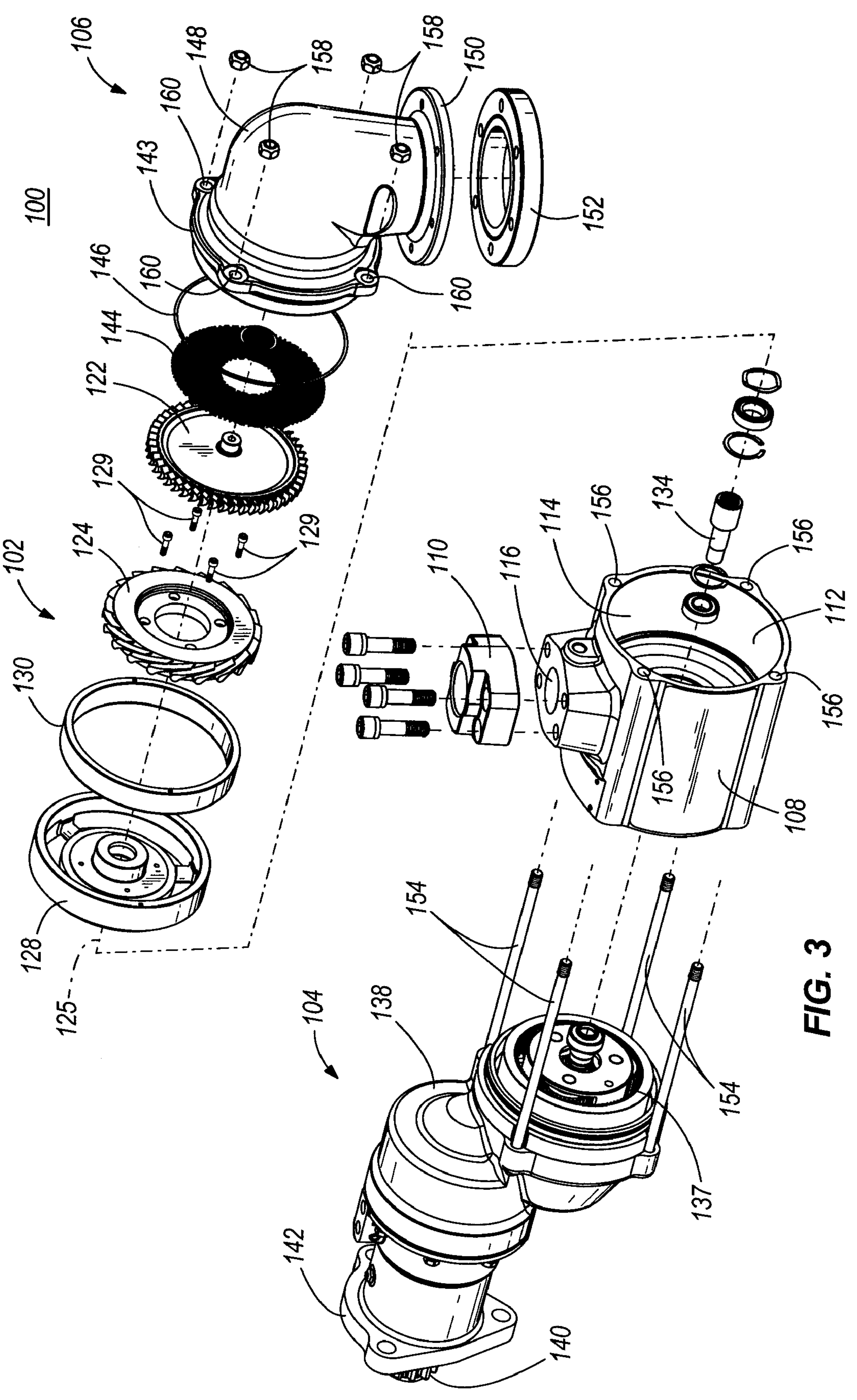
FIG. 3 is an exploded view of the starter system of FIG. 1.

FIGS. 1-3 illustrate a starter system 100 according to one embodiment of the invention. Starter system 100 can couple to an engine 101 (FIG. 2) for providing start-up cranking of the engine 101. Starter system 100 can be used with any type of engine, including but not limited to, internal combustion engines, diesel engines, and turbine and microturbine engines.

Starter system 100 can include an air motor module 102, a gear assembly 104 and motive fluid outlet 106. The gear assembly 104 is at the front of the starter system 100 oriented towards the engine 101 while the motive fluid outlet 106 is at the rear of the starter system 100 away from the engine 101. The air motor module 102 can include an air motor housing 108 with a motive fluid inlet 110 for receiving a motive fluid, such as pressurized air or natural gas, into the air motor housing 108, and a service aperture 112 at one end of the housing 108. The air motor housing 108 can define an air motor chamber 114 in fluid communication with the motive fluid inlet 110 via a channel 116.

With reference to FIGS. 2 and 3, the air motor module 102 can further include a rotor 122, a stator 124, a stator housing 128 and a containment ring 130 arranged along the longitudinal axis 125. As shown in FIG. 3, the stator 124 can be secured to the stator housing128 against rotation by way of fasteners 129. The stator 124 can direct the flow of motive fluid against the rotor 122 to cause rotation of the rotor 122 with respect to the stator 124. In one example, the motive fluid may be provided in the range of 30-150 psig, the stator 124 may act as a supersonic nozzle, and the rotor 122 may be designed to have a free turbine or "run away" speed of 65,000 rpm. The rotor 122 can be interconnected with the gear assembly 104 via, for example, an air motor shaft 134. The air motor shaft 134 is supported for rotation by bearings in the motor housing 108.

With reference again to FIG. 2, the gear assembly 104 can include one or more speed reducing gears 136 and a planetary gear 137 within a gear housing 138. Mounted at opposite ends of the reducing gears 136 and the planetary gear 137 are the air motor shaft 134 and an output member 140. The reducing gears 136 and the planetary gear 137 cause rotation of the output member 140 in response to rotation of the air motor shaft 134, while reducing speed and increasing torque of the output member 140 compared to the air motor shaft 134. In other embodiments, however, the reducing gears 136 and/or the planetary gear 137 may be excluded from the starter system 100. As shown in FIG. 2, the gear housing 136 is offset from the longitudinal axis 125 so that the output member 140 is offset from the longitudinal axis 125. In other embodiments, however, the gear housing 136 and/or the output member 140 is arranged along the longitudinal axis 125 as well.

The output member 140 can be, for example, a pinion. The output member 140 can interface (e.g., through direct meshing with a gear, or through a belt, a chain, a plurality of gears, or any other suitable means for transferring rotation and torque) with a movable portion, mechanism, or member 141 of the engine 101 and can be operable to move the movable portion 141 of the engine 101 in response to rotation of the reducing gears 136 in the gear housing 138. The movable portion 141 of the engine 101 may include, for example, a crankshaft, a gear or other torque transfer member, and other movable parts. The rotor 122 rotates at a first speed in response to the flow of motive fluid through the channel 116 and chamber 114 of the motor housing 108. The planetary gear 137 rotates in response to rotation of the rotor 122 via the air motor shaft 134 and drives the speed-reducing gears 136. The output member 140 rotates at a second speed slower than the first speed in response to rotation of the speed-reducing gears 136 to cause the movable portion 141 of the engine 101 to move and start the engine 101.

In cases where the movable engine portion 141 is rotatable, the output member 140 can be said to transfer torque from the starter system 100 to the engine 101. This movement of the movable portion 141 of the engine 101 by the output member 140 can effectively start the engine 101. The gear housing 138 can include a flange 142 at an end opposite the air motor shaft 134. The flange 142 facilitates mounting the gear assembly 104 to the engine 101 or near the engine 101 to engage the output member 140 with the movable portion 141 of the engine 101.

The motive fluid outlet 106 can provide an exhaust system for the motive fluid from the starter system 100. The motive fluid outlet 106 can direct the flow of motive fluid out of the air motor housing 108 after the motive fluid has flown past the rotor 122. The motive fluid outlet 106 can include an exhaust cap 143 mounted to the air motor housing 108 over the service aperture 112. Thus, the output member 140 and mounting flange 142 are at a first end of the gear housing 138, a second end of the gear housing 138 (opposite the first end) is mounted to a first end of the motor housing 108, a second end of the motor housing 108 (opposite the first end) defines the service aperture 112 and has mounted thereon the exhaust cap 143.

A debris screen 144 can be positioned between the air motor housing 108 and the exhaust cap 143 for trapping debris. An O-ring seal 146 can also be positioned between the air motor housing 108 and the exhaust cap 143 to prevent motive fluid leakage. The exhaust cap 143, debris screen 144 and O-ring seal 146 can be arranged along the longitudinal axis 125 as well.

The motive fluid outlet 106 can further include a conduit 148 for directing exhaust motive fluid away from the starter system 100. The conduit 148 can be, for example, an elbow. The conduit 148 can include a pipe flange 150 for mounting the conduit 148 to a pipe coupling 152 to facilitate securing the conduit 148 to a pipe or other structure for directing the exhaust motive fluid to a remote location. The elbow version of the conduit 148 illustrated in the drawings may be employed in applications that use natural gas or another combustible gaseous fuel as the motive fluid, as for example, at a site that has a ready supply of such fuel for the engine 101 or another device. The pipe to which the conduit 148 is secured through the pipe coupling 152 may direct the natural gas or other combustible gaseous fuel to a flare or the combustion chamber of another device for immediate combustion, or may recapture the natural gas or other combustible gaseous fuel for future use.

In alternate embodiments of the motive fluid outlet 106, the conduit 148 may be replaced with a diffuser mounted to the exhaust cap 143. The diffuser would lower the pressure of the motive fluid prior to venting the motive fluid to the atmosphere or ambient surroundings. Such diffuser may be particularly useful in applications using compressed air as the motive fluid. The term "desired destination" is used herein to refer to the atmosphere, conduits, flares, combustion chambers, or any other destination for the motive fluid upon flowing out of the motive fluid outlet 106.

Figure 4:
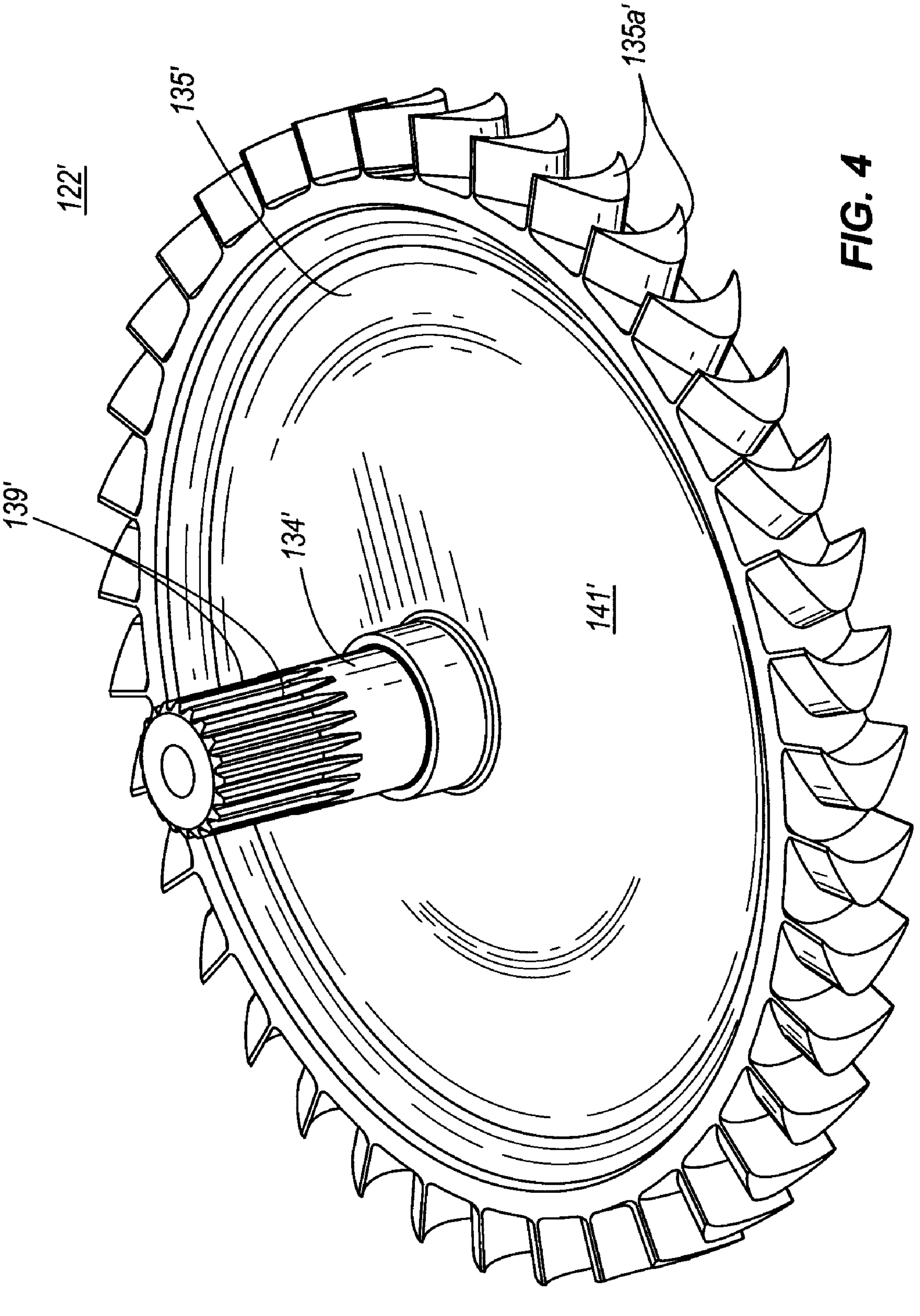
FIG. 4 is a perspective view of a rotor according to an embodiment of the invention.
Figure 5:
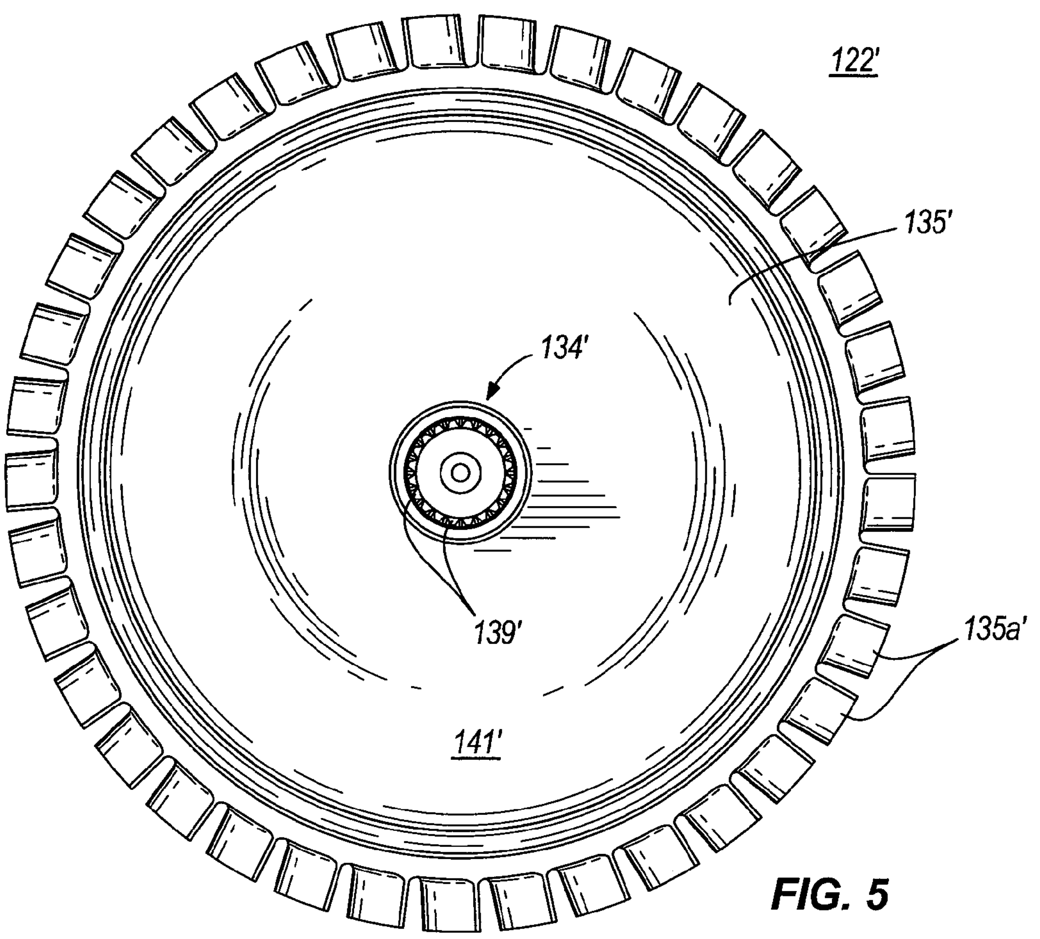
FIG. 5 is a front view of the rotor of FIG. 4.
Figure 6:
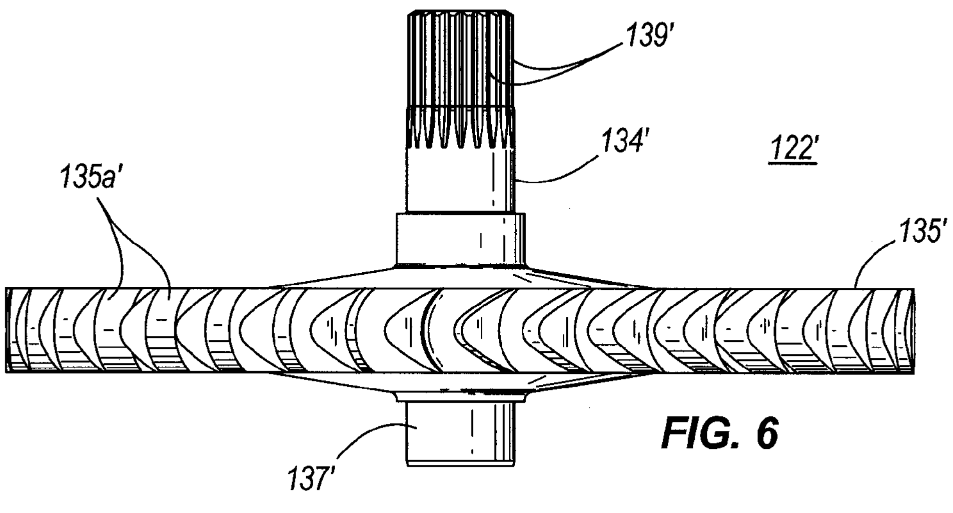
FIG. 6 is a side view of the rotor of FIG. 4.

FIGS. 4-6 illustrate a rotor 122' according to an embodiment of the invention. The rotor 122' includes an air motor shaft portion 134', a vane portion 135' and a stub portion 137'. The rotor 122' can replace the rotor 122 and air motor shaft 134 of the embodiment shown generally in FIGS. 1-3. The air motor shaft portion 134' can be supported for rotation on bearings on a forward side of the rotor 122', while the stub portion 137' can be supported for rotation on bearings on a rear side of the rotor 122' (bearings not shown). The flow of motive fuel over the vane portion 135' drives rotation of the rotor 122', including rotation of the air motor shaft portion 134'.

The rotor 122' is a unitary member, in that the air motor shaft portion 134', the vane portion 135' and the stub portion 137' are integrally formed with one another as a single, unitary piece. Because the air motor shaft portion 134', the vane portion 135' and the stub portion 137' are integral with one another, connectors, fasteners or other mechanical or non-mechanical connectors for connecting the vane portion 135' to the air motor shaft portion 134' and to the stub portion 137' are not required.

The rotor 122' is formed of a lightweight material such as aluminum. All or a portion of an outer surface 141' of the rotor 122' is anodized to provide the rotor 122' with an outer anodic coating. The process of forming an anodic coating on aluminum is well known in the art of materials processing, and may be accomplished according to various methods so as to produce anodic coatings having varying strength, wear and finish characteristics. In general, however, the anodic coating provides the rotor 122' with improved strength and wear characteristics in relation to non-anodized aluminum. In some embodiments, all or a portion of the outer surface 141' of the rotor 122' can be hard anodized. By hard anodized, it is meant that the primary characteristics of the hard anodic coating are surface hardness and abrasion resistance. The rotor 122' can have a hard anodic coating that is at least approximately 25 microns thick. In one embodiment, at least a portion of the rotor 122' includes an anodic coating substantially equivalent to a type III, Mil-A-8625F, hard anodic coating. A type III, Mil-A-8625F hard anodic coating has a nominal thickness of from about 0.0005-0.0045 inches and does not vary by more than ±20% for coatings up to 0.002 inches thick. Type III, Mil-A-8625F hard anodic coatings over 0.002 inches do not vary by more than ±0.0004 inches (0.4 mils) in thickness. A type III, Mil-A-8625F hard anodic coating has a minimum coating weight of 4320 milligrams per square foot for 0.001 inch of coating. A type III, Mil-A-8625F hard anodic coating has a maximum wear index of 3.5 mg/1000 cycles on aluminum alloys having a copper content of 2% or higher. A type III, Mil-A-8625F hard anodic coating has a maximum wear index 1.5 mg/1000 cycles for all other alloys.

The rotor 122' is a solid member. By solid, it is meant that the rotor 122' lacks apertures, openings, internal hollows, cavities, voids or other discontinuities. This does not include individual spaced apart vanes 135'*a* formed about a periphery of the vane portion 135' acted on by the motive fluid to rotate the rotor 122'. Openings for receiving fasteners for connecting the air motor shaft 134 to the rotor 122 are eliminated because the rotor 122' is a unitary, single piece with the vane portion 135 integrally formed with the air motor shaft portion 134'. The lack of apertures and other voids in the rotor 122' (i.e., that the rotor 122' is a solid member) provides a more uniform distribution of rotational stresses throughout the rotor 122', especially at takeoff. Because rotational stresses are distributed more uniformly, the rotor 122' need not be formed of a heavy duty material, such as steel, as would be necessary to withstand localized rotational stresses caused by apertures, discontinuities or voids.

As illustrated in FIG. 4, the air motor shaft portion 134' includes a plurality of splines or axially oriented ribs and grooves 139'. The splines 139' of the air motor shaft portion 134' can mate with a component (not shown) of the gear assembly 104 having complementary splining in a male to female relationship. In this manner, the rotor 122' can be interconnected with the gear assembly 104 via the air motor shaft portion 134'. The mated splines 139' permit the rotor 122' to impart torque output or rotational energy to the gear assembly 104 via the air motor shaft portion 134'.

The splining arrangement permits relative axial movement between the air motor shaft portion 134' and the gear assembly 104. In other words, the air motor shaft portion 134' can slide in a rearward and forward direction relative to the gear assembly 104. This axial play is useful in aligning the air motor shaft portion 134' with the input side of the gear assembly 104, and relieves the need for precise axial positioning of the input side of the gear assembly 104 with the air motor shaft portion 134'. Sometimes, the flow of motive fluid over the rotor 122' induces an axial thrust force on the rotor 122'. Wave springs or other biasing members may be provided between the air motor shaft portion 134' and the motor housing 102 for absorbing the axial thrust force. The splining arrangement permits some axial play of the rotor 122' as such biasing members collapse. This reduces localized stresses and wear on the rotor 122' due to the axial thrust force not borne by the gear assembly 104.

The rotor 122' is illustrated and described as a component of the engine starter 100. The rotor 122' can, however, be sized and shaped for use with other types of engine starters, and for other types of air motors in general. The engine starter 100 can be serviced by accessing the service aperture 112 and removing the rotor 122 and the air motor shaft 134 from the starter 100 through the service aperture 112. The rotor 122 and the air motor shaft 134 can be replaced with the rotor 122'. In this regard, the invention provides a method for retrofitting an existing air starter with a single piece rotor/output shaft part.

Thus, the invention provides, among other things, an air motor engine starter having a unitary rotor construction. Various features and advantages of the invention are set forth in the following claims.

What is claimed is:

1. A starter for moving a movable portion of an engine to start the engine, the starter comprising:
- a gear housing having first and second opposite ends;
- a gear assembly within the gear housing and including a plurality of speed-reducing gears;
- an output member at the first end of the gear assembly adapted to operably couple to the movable portion of the engine;
- a motor housing having a first end mounted to the second end of the gear housing and a second end opposite the first end;
- a motive fluid inlet adapted to permit a flow of motive fluid into the motor housing;
- a rotor mounted within the motor housing and rotatable within the housing under the influence the flow of the motive fluid; and
- a motive fluid outlet mounted to the second end of the motor housing, and adapted to exhaust the motive fluid to a desired destination after the motive fluid has flown though the motor housing;
- wherein the rotor has a shaft portion and a vane portion, the shaft portion and the vane portion being an integral, unitary piece, the shaft portion having splines for mating with and transferring torque to the gear assembly, wherein the rotor is formed from aluminum and at least a portion of the rotor includes an anodized coating.

2. The starter of claim 1, wherein the rotor further comprises a stub portion on an opposite side of the vane portion as the shaft portion, the stub portion being integrally formed with the vane portion and the shaft portion.

3. The starter of claim 1, wherein substantially the entire surface of the rotor includes an anodized coating.

4. The starter of claim 1, wherein the anodized coating is a hard anodized coating.

5. The starter of claim 1, wherein the anodized coating has a thickness of from about 0.0005-0.0045 inches.

6. The starter of claim 1, wherein the rotor is a solid member.

7. A rotor for an engine starter for moving a movable portion of an engine to start the engine, the rotor comprising:
- a rotor having a shaft portion and a vane portion, the shaft portion and the vane portion being integral with one another so as to be an integral, unitary piece, the shaft portion having splines for coupling to a movable portion of the engine, the splines preventing relative rotational movement between the rotor and the movable portion and permitting relative axial movement, wherein the rotor is formed from aluminum and at least a portion of the rotor includes an anodized coating.

8. The rotor of claim 7, wherein the rotor further comprises a stub portion on an opposite side of the vane portion as the shaft portion, the stub portion being integrally formed with the vane portion and the shaft portion.

9. The rotor of claim 7, wherein substantially the entire surface of the rotor includes an anodized coating.

10. The rotor of claim 7, wherein the anodized coating is a hard anodized coating.

11. The rotor of claim 7, wherein the anodized coating has a thickness of from about 0,0005-0.0045 inches.

12. The rotor of claim 7, wherein the rotor is a solid member.

13. A method of servicing a starter for moving a movable portion of an engine to start the engine, the method comprising:

accessing a service aperture in the starter;

removing a rotor from the starter through the service aperture;

removing an air motor shaft from the starter through the service aperture;

replacing the rotor and the air motor shaft with an integral rotor having a shaft portion and a vane portion, the shaft portion and the vane portion being an integral, unitary piece, the shaft portion having splines for coupling to a movable portion of the engine, the splines preventing relative rotational movement between the integral rotor and the movable portion and permitting relative axial movement, wherein the integral rotor is formed from aluminum and at least a portion of the integral rotor includes an anodized coating.

14. The method of claim 13, wherein the integral rotor further comprises a stub portion on an opposite side of the vane portion as the shaft portion, the stub portion being an integral, unitary piece with the vane portion and the shaft portion.

15. The method of claim 13, wherein substantially the entire surface of the integral rotor includes an anodized coating.

16. The method of claim 13, wherein the anodized coating is a hard anodized coating.

17. The method of claim 13, wherein the anodized coating has a thickness of from about 0.0005-0.0045 inches.

18. The method of claim 13, wherein the integral rotor is a solid member.

19. The method of claim 13, wherein the rotor and the air motor shaft are mounted to one another with fasteners.

* * * * *